United States Patent
Vajapeyam et al.

(10) Patent No.: US 10,009,926 B2
(45) Date of Patent: Jun. 26, 2018

(54) METHODS AND APPARATUS FOR CONNECTIONLESS ACCESS

(71) Applicant: QUALCOMM Incorporated, San Diego, CA (US)

(72) Inventors: Madhavan Srinivasan Vajapeyam, San Diego, CA (US); Miguel Griot, La Jolla, CA (US); Hao Xu, San Diego, CA (US); Durga Prasad Malladi, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 14/736,946

(22) Filed: Jun. 11, 2015

(65) Prior Publication Data

US 2016/0014815 A1 Jan. 14, 2016

Related U.S. Application Data

(60) Provisional application No. 62/023,794, filed on Jul. 11, 2014.

(51) Int. Cl.
*H04W 74/08* (2009.01)
*H04W 4/70* (2018.01)
*H04W 76/27* (2018.01)

(52) U.S. Cl.
CPC ......... *H04W 74/0833* (2013.01); *H04W 4/70* (2018.02); *H04W 76/27* (2018.02)

(58) Field of Classification Search
None
See application file for complete search history.

(56) References Cited

U.S. PATENT DOCUMENTS

| 2012/0208545 | A1* | 8/2012 | Yang | H04W 74/002 455/450 |
| 2012/0213165 | A1 | 8/2012 | Miklos et al. | |
| 2013/0301611 | A1* | 11/2013 | Baghel | H04W 72/04 370/331 |

OTHER PUBLICATIONS

International Search Report and Written Opinion—PCT/US2015/035553—ISA/EPO—dated Aug. 25, 2015.
Rajavelsamy R., et al., "A method of efficient data transmission over Evolved Packet System", IEEE International Conference on Communications (ICC), Jun. 10, 2014 (Jun. 10, 2014), pp. 2460-2465, XP032632436, DOI: 10.1109/ICC.2814.6883692 [retrieved on Aug. 26, 2014] Section I, III.A, C, D; figures 1,3,4.

* cited by examiner

*Primary Examiner* — Kouroush Mohebbi
(74) *Attorney, Agent, or Firm* — Patterson & Sheridan, L.L.P.

(57) ABSTRACT

Certain aspects of the present disclosure generally relate to techniques for connectionless access by a wireless device. Such connectionless access may allow for the transmission of data without the overhead associated with establishing conventional connected access (e.g., radio resource control (RRC) connection) to a network. As a result, a device with relatively little data to transmit, such as a machine type communications (MTC) device, may be able to efficiently exit an idle mode, transmit the data during a connectionless access, and subsequently return to idle mode in a shorter period of time than conventional methods.

14 Claims, 9 Drawing Sheets

METHODS AND APPARATUS FOR CONNECTIONLESS ACCESS

The present application claims priority to provisional U.S. Application Ser. No. 62/023,794, entitled "METHODS AND APPARATUS FOR CONNECTIONLESS ACCESS," filed Jul. 11, 2014, which is assigned to the assignee of the present application and hereby expressly incorporated by reference herein in its entirety.

FIELD

Certain aspects of the present disclosure generally relate to methods and apparatus for performing connectionless access to a network, for example, to perform machine type communications (MTC).

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, Long Term Evolution Advanced (LTE-A) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

Certain types of devices, such as MTC devices may have only a small amount of data to send and may send that data relatively infrequently. In such cases, the amount of overhead necessary to establish a network connection may by very high relative to the actual data sent during the connection.

SUMMARY

Certain aspects of the present disclosure provide a method for wireless communications by a user equipment (UE). The method generally includes transmitting, while the UE is in an idle mode, a random access request message to a base station (BS) as a request for system access, providing an indication that the request is for connectionless access for transmitting data before returning to the idle mode without entering a radio resource control (RRC) connected mode, receiving a response with an uplink grant from the BS for transmission by the UE during the connectionless access, transmitting to the BS during the connectionless access, and returning to the idle mode upon reception of an indication of a release.

Certain aspects of the present disclosure provide a method for wireless communications by a base station (BS). The method generally includes receiving, from a UE in an idle mode, a random access request message as a request for system access, receiving, from the UE, an indication that the request is for connectionless access for the UE to transmit data before returning to the idle mode without entering an RRC connected mode, transmitting, to the UE, a response with an uplink grant from the BS for transmission by the UE during the connectionless access, and receiving a transmission from the UE during the connectionless access.

Certain aspects of the present disclosure provide an apparatus for wireless communications by a user equipment (UE). The apparatus generally includes means for transmitting, while the UE is in an idle mode, a random access request message to a BS as a request for system access; means for providing an indication that the request is for connectionless access for transmitting data before returning to the idle mode without entering an RRC connected mode; means for receiving a response with an uplink grant from the BS for transmission by the UE during the connectionless access; means for transmitting to the BS during the connectionless access; and means for returning to the idle mode upon reception of an indication of a release.

Certain aspects of the present disclosure provide an apparatus for wireless communications by a base station (BS). The apparatus generally includes means for receiving, from a user equipment (UE) in an idle mode, a random access request message as a request for system access; means for receiving, from the UE, an indication that the request is for connectionless access for the UE to transmit data before returning to the idle mode without entering an RRC connected mode; means for transmitting, to the UE, a response with an uplink grant from the BS for transmission by the UE during the connectionless access; and means for receiving a transmission from the UE during the connectionless access.

Certain aspects of the present disclosure also provide various apparatus capable of performing the operations described above (e.g., an apparatus comprising at least one processor), as well as corresponding computer readable media having instructions stored thereon for performing the operations described above.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

DETAILED DESCRIPTION

Figure 1:
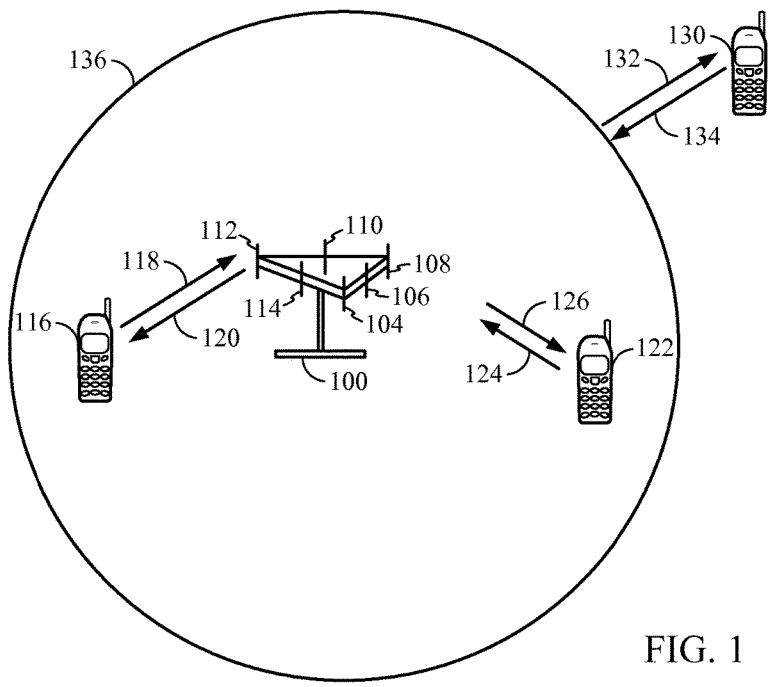
FIG. 1 illustrates an example multiple access wireless communication system, in accordance with certain aspects of the present disclosure.

Aspects of the present disclosure provide techniques for connectionless access by a wireless device. As will be described in greater detail below, such connectionless access may allow for the transmission of data without the overhead associated with establishing conventional connected access to a network. As a result, a device with relatively little data to transmit, such as an MTC device, may be able to efficiently exit an idle mode, transmit the data during a connectionless access, and subsequently return to idle mode. Examples of MTC devices include various wireless sensors or other type data monitoring, generating, or relaying devices that may be expected to operate (possibly unattended) for years on a single battery charge. Additional examples of MTC devices include robots, drones, and wearable devices (e.g., smart glasses, smart wristbands, smart watches, smart bracelets, smart rings, etc.).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2).

Single carrier frequency division multiple access (SC-FDMA) is a transmission technique that utilizes single carrier modulation at a transmitter side and frequency domain equalization at a receiver side. SC-FDMA has similar performance and essentially the same overall complexity as those of OFDMA system. However, SC-FDMA signal has lower peak-to-average power ratio (PAPR) because of its inherent single carrier structure. SC-FDMA has drawn great attention, especially in the uplink (UL) communications where lower PAPR greatly benefits the mobile terminal in terms of transmit power efficiency.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, or some other terminology. In some implementations, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Some ATs may be considered MTC ATs, which may include remote devices, such as sensors, meters, location tags, monitoring devices, etc., that may communicate with a base station, another remote device, or some other entity. MTC may refer to communication involving at least one remote device on at least one end of the communication and may include forms of data communication which involve one or more entities that do not necessarily need human interaction. MTC ATs may include ATs that are capable of MTC communications with MTC servers and/or other MTC devices through Public Land Mobile Networks (PLMN), for example. Accordingly, one or more aspects taught herein may be incorporated into a phone (e.g., a cellular phone, a smart phone), a computer (e.g., a desktop), an MTC device, a portable communication device, a portable computing device (e.g., a laptop, a personal data assistant, a tablet, a netbook, a smartbook, an ultrabook), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect is illustrated. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 104 and 106, where antennas 104 and 106 transmit information to access terminal 122 over forward link 126 and receive information from access terminal 122 over reverse link 124. In a Frequency Division Duplex (FDD) system, communication links 118, 120, 124, and 126 may use different frequency for communication. For example, forward link 120 may use a different frequency than that used by reverse link 118.

Each group of antennas and/or the area in which they are designed to communicate is often referred to as a sector of the access point. In one aspect of the present disclosure, each antenna group may be designed to communicate to access terminals in a sector of the areas covered by access point 100.

Access terminal 130 may be in communication with access point 100, where antennas from the access point 100 transmit information to access terminal 130 over forward link 132 and receive information from the access terminal 130 over reverse link 134.

In communication over forward links 120 and 126, the transmitting antennas of access point 100 may utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

Figure 2:
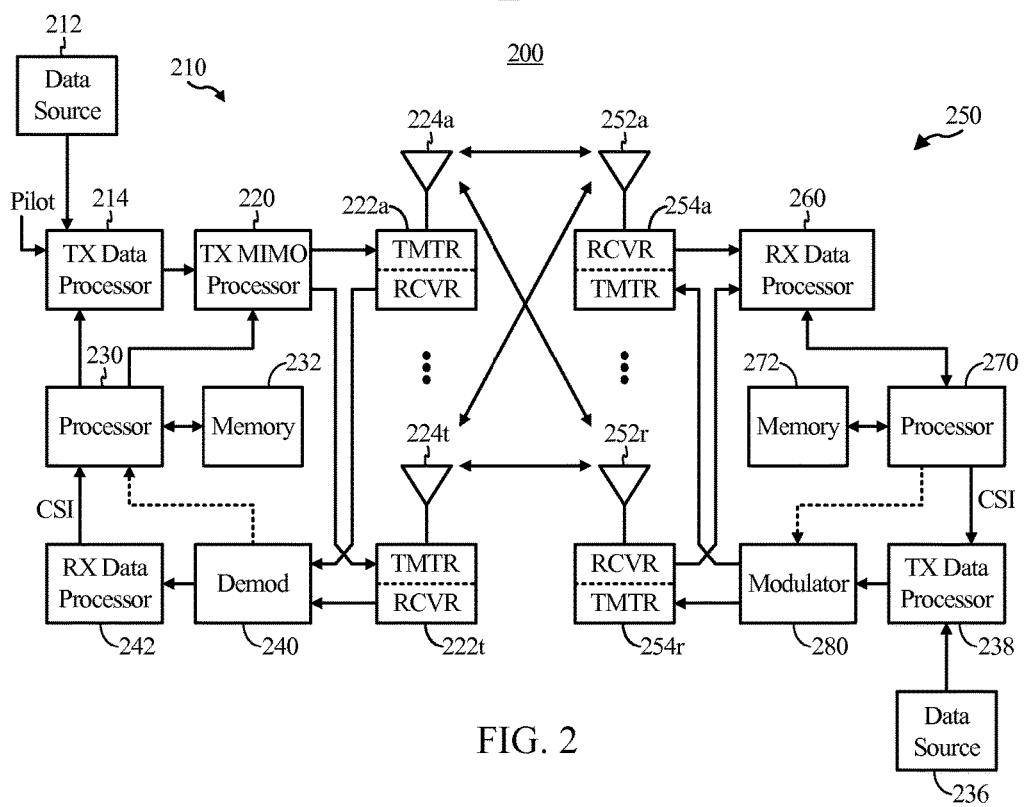
FIG. 2 illustrates a block diagram of an access point and a user terminal, in accordance with certain aspects of the present disclosure.

FIG. 2 illustrates a block diagram of an aspect of a transmitter system 210 (e.g., an access point in an aspect) and a receiver system 250 (e.g., an access terminal in as aspect) in a multiple-input multiple-output (MIMO) system 200. Each of system 210 and system 250 has capabilities to both transmit and receive. Whether system 210 or system 250 is transmitting, receiving, or transmitting and receiving simultaneously depends on the application. At the transmitter system 210, traffic data for a number of data streams is provided from a data source 212 to a transmit (TX) data processor 214. In other aspects, transmit system 210 may be an access terminal and receiver system 250 may be an access point.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230. Memory 232 may store data and software/firmware for the transmitter system 210.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. Memory 272 may store data and software/firmware for the receiver system 250. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

Any one of the processor 270, RX data processor 260, TX data processor 238, or other processors/elements, or a combination thereof of the access terminal 250 and/or any one of the processor 230, TX MIMO processor 220, TX data processor 214, RX data processor 242, or other processors/elements, or a combination thereof of the access point 210 may be configured to perform the procedures for connectionless access in accordance with certain aspects of the present disclosure discussed below. In an aspect, at least one of the processor 270, RX data processor 260, and TX data processor 238 may be configured to execute algorithms stored in memory 272 for performing the random-access channel (RACH) procedures for connectionless access described herein. In another aspect, at least one of the processor 230, TX MIMO processor 220, TX data processor 214, and RX data processor 242 may be configured to execute algorithms stored in memory 232 for performing the RACH procedures for connectionless access described herein.

Figure 3:
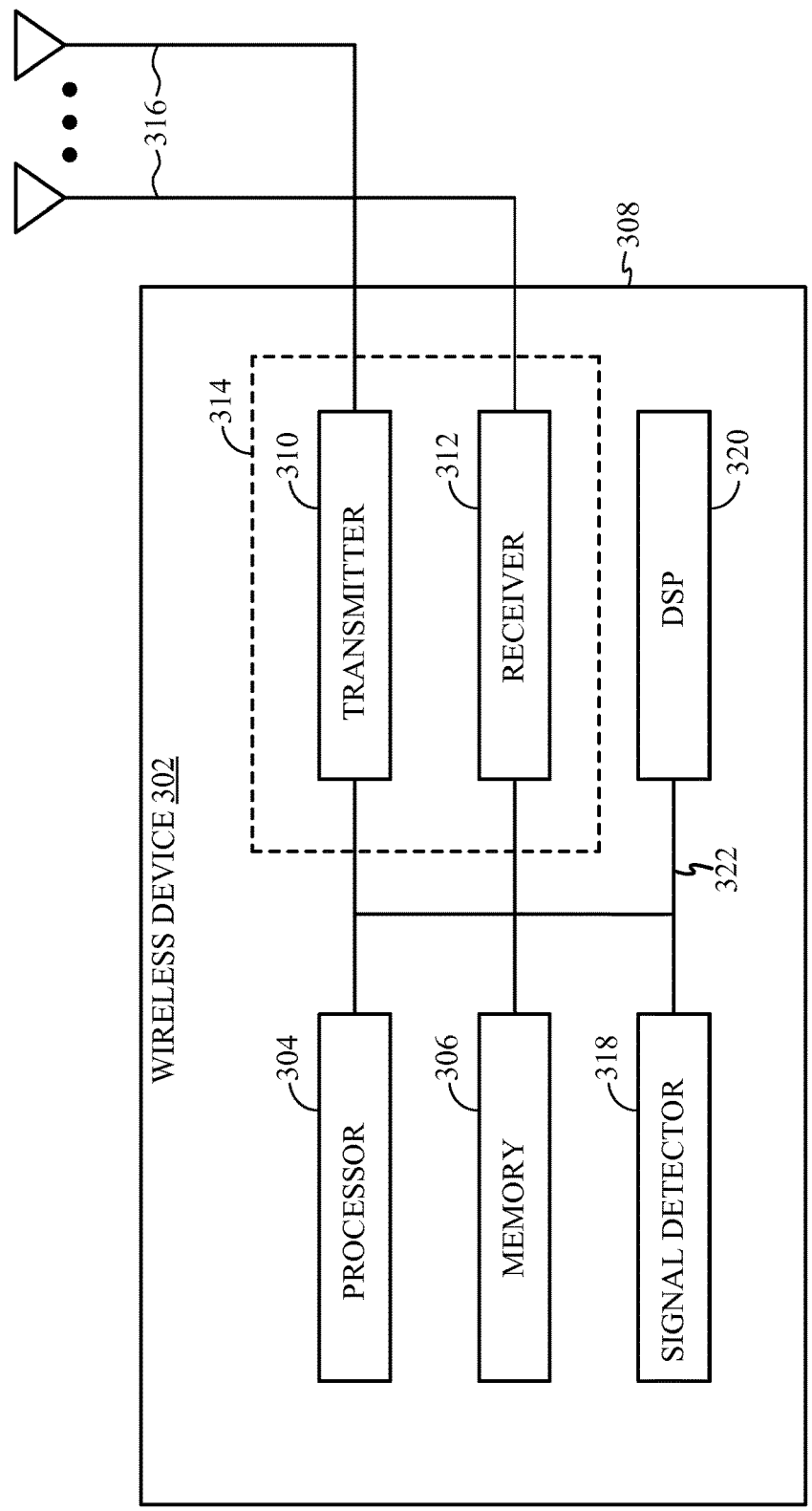
FIG. 3 illustrates various components that may be utilized in a wireless device, in accordance with certain aspects of the present disclosure.

FIG. 3 illustrates various components that may be utilized in a wireless device 302 that may be employed within the wireless communication system illustrated in FIG. 1. The wireless device 302 is an example of a device that may be configured to implement the various methods described herein. The wireless device 302 may be a base station (e.g., access point 100) or an user terminal (e.g., access terminal 116, access terminal 122, etc.).

The wireless device 302 may include a processor 304 that controls operation of the wireless device 302. The processor 304 may also be referred to as a central processing unit (CPU). Memory 306, which may include read-only memory (ROM), random access memory (RAM), flash memory, phase change memory, etc., provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein, for example, to allow a UE to efficiently transmit data during a connectionless access.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and coupled (e.g., electrically) to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus. The processor 304 may be configured to access instructions stored in the memory 306 to perform connectionless access, in accordance with aspects of the present disclosure discussed below.

Figure 4:
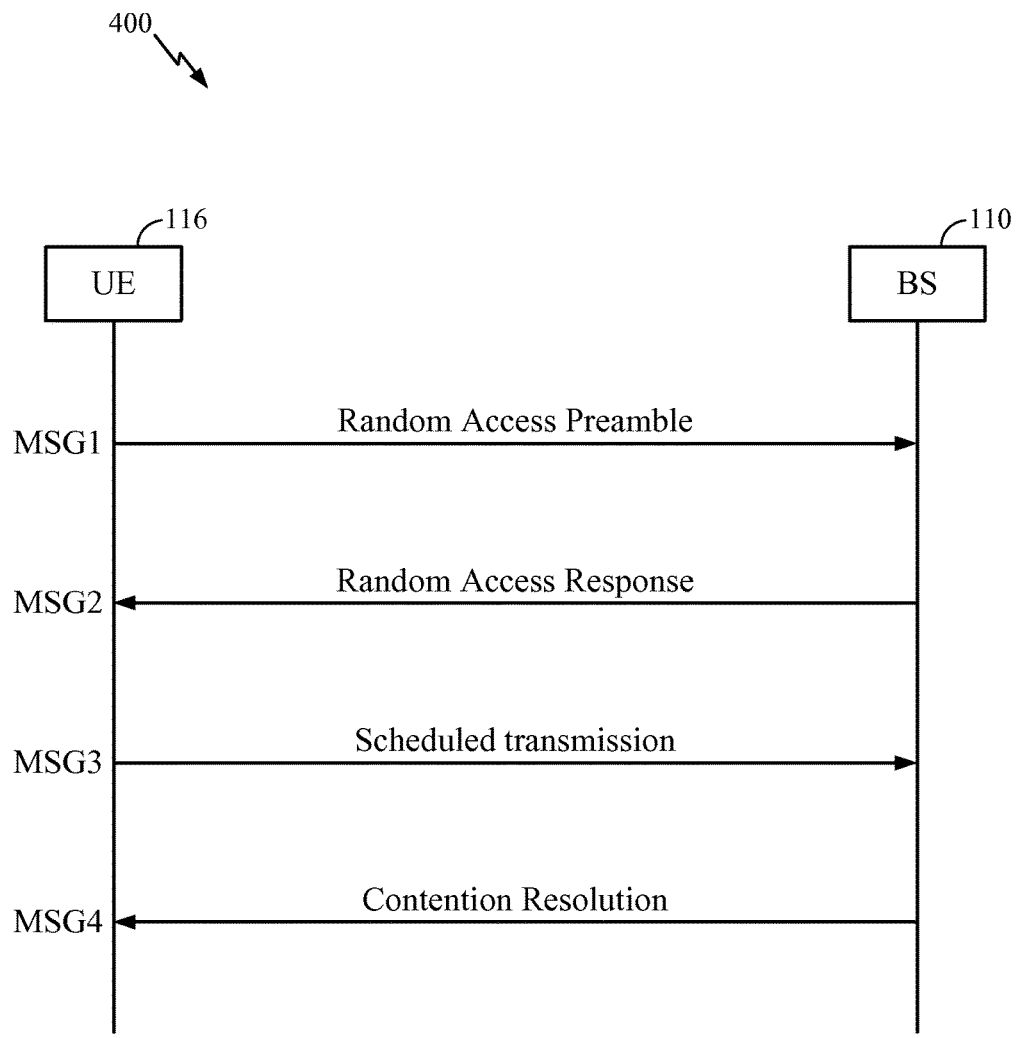
FIG. 4 illustrates a call flow diagram illustrating an LTE random-access channel (RACH) contention-based procedure, in accordance with certain aspects of the present disclosure.

FIG. 4 illustrates a message flow 400 for an example LTE RACH contention-based procedure, in accordance with certain aspects of the present disclosure. At 402, a UE 116 may send a preamble (MSG1) to a BS 100, assuming an initial Timing Advance (TA) of zero for FDD. Typically, a preamble is randomly chosen by the UE among a set of preambles allocated on the cell and may be linked to a requested size for MSG3. The BS 100 may send MSG2 comprising a random access response (RAR). MSG 2 may also indicate a grant for MSG 3. The UE may send MSG3, including the scheduled transmission, using the grant. The eNB may decode MSG3 and either echo back the radio resource control (RRC) signaling message or send an UL grant (e.g., DCI (downlink control information) 0) scrambled with a cell radio network temporary identifier (C-RNTI) as a contention resolution (MSG4).

Methods and Apparatus for Performing Connectionless Access

In some cases, the RACH procedure described above may be modified to provide for connectionless access by a wireless device. In such cases, a UE (e.g., an MTC device) in idle mode attempting to access the network may provide an indication that requested access is for "connectionless access" so the UE can transmit data without the overhead associated with entering an RRC connected mode.

In order to conserve power, certain types of devices (e.g., MTC devices, enhanced MTC (eMTC) devices, etc.) are expected to be in a low power state (e.g., an idle state) most of the time. Each time a mobile terminated (MT) or mobile originated (MO) data connection is required, the device transitions from the idle state to a connected state. This transition typically entails several steps: Random Access and Contention Resolution, Radio Resource Control (RRC) Connection Setup, Service Request, Security activation, and data radio bearer (DRB) establishment, which may be followed by the actual data transmission and reception. The amount of time taken for completion of the signaling exchange to enter connected state may be larger than the time taken by the actual data transmission and reception itself. A UE typically cannot return to idle mode until the device has transitioned to connected state and has completed data transmission and reception, even though the amount of data may be small. Therefore, considering that a greater amount of time may be taken to enter connected state than the time taken for the actual data exchange, this process may not be power efficient. Therefore, what is needed are apparatus and techniques for exchanging data that allow a UE to return to an idle state more quickly than conventional methods.

Aspects of the present disclosure provide for connectionless access that may help reduce the signaling overhead when transitioning from an idle mode to transmit or receive data. This connectionless access mode may allow for fast transitions without requiring full RRC connection setup.

Figure 5:
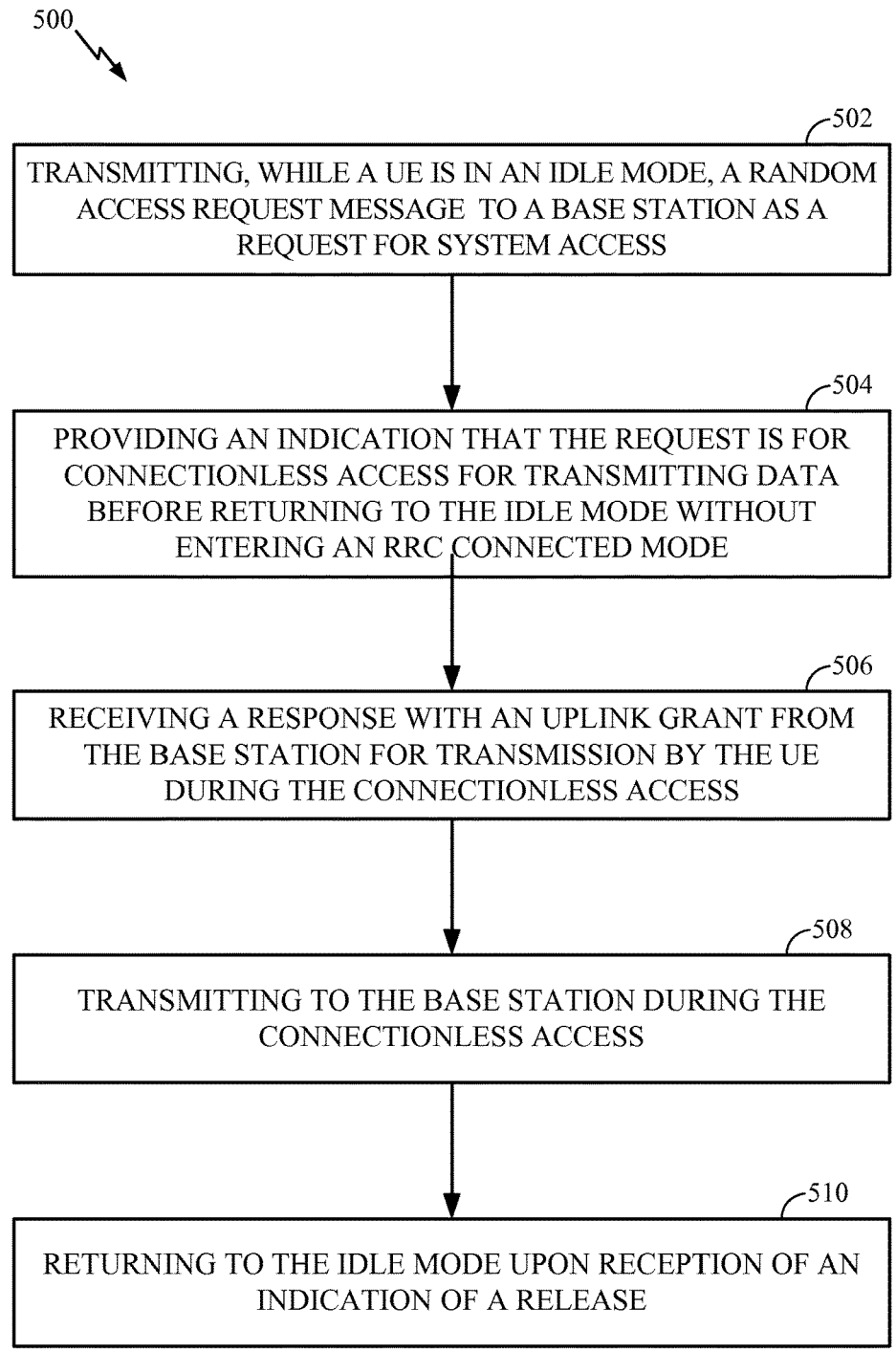
FIG. 5 is a flow diagram illustrating example operations for connectionless access that may be performed by a user equipment (UE), in accordance with certain aspects of the present disclosure.

FIG. 5 illustrates example operations 500 that may be performed by a UE, such as access terminal 116 of FIG. 1, for connectionless access, in accordance with certain aspects of the present disclosure.

At 502, the UE transmits, while in an idle mode, a random access request message (e.g., RACH preamble) to a BS as a request for system access. At 504, the UE provides an indication that the request is for connectionless access for transmitting data before returning to the idle mode without entering an RRC connected mode. As will be described in detail below, this indication may be provided in the random access request message itself (e.g., an enhanced MSG1), or at a later time (e.g., in an enhanced MSG3).

At 506, the UE receives a response with an UL grant from the BS for transmission by the UE during the connectionless access. At 508, the UE transmits data to the BS during the connectionless access. The transmission may include security and/or non-access stratum (NAS) control messages. At 510, the UE returns to the idle mode upon reception of an indication of a release. As will be described in detail below, the indication of release may be implicit or explicit.

Figure 6:
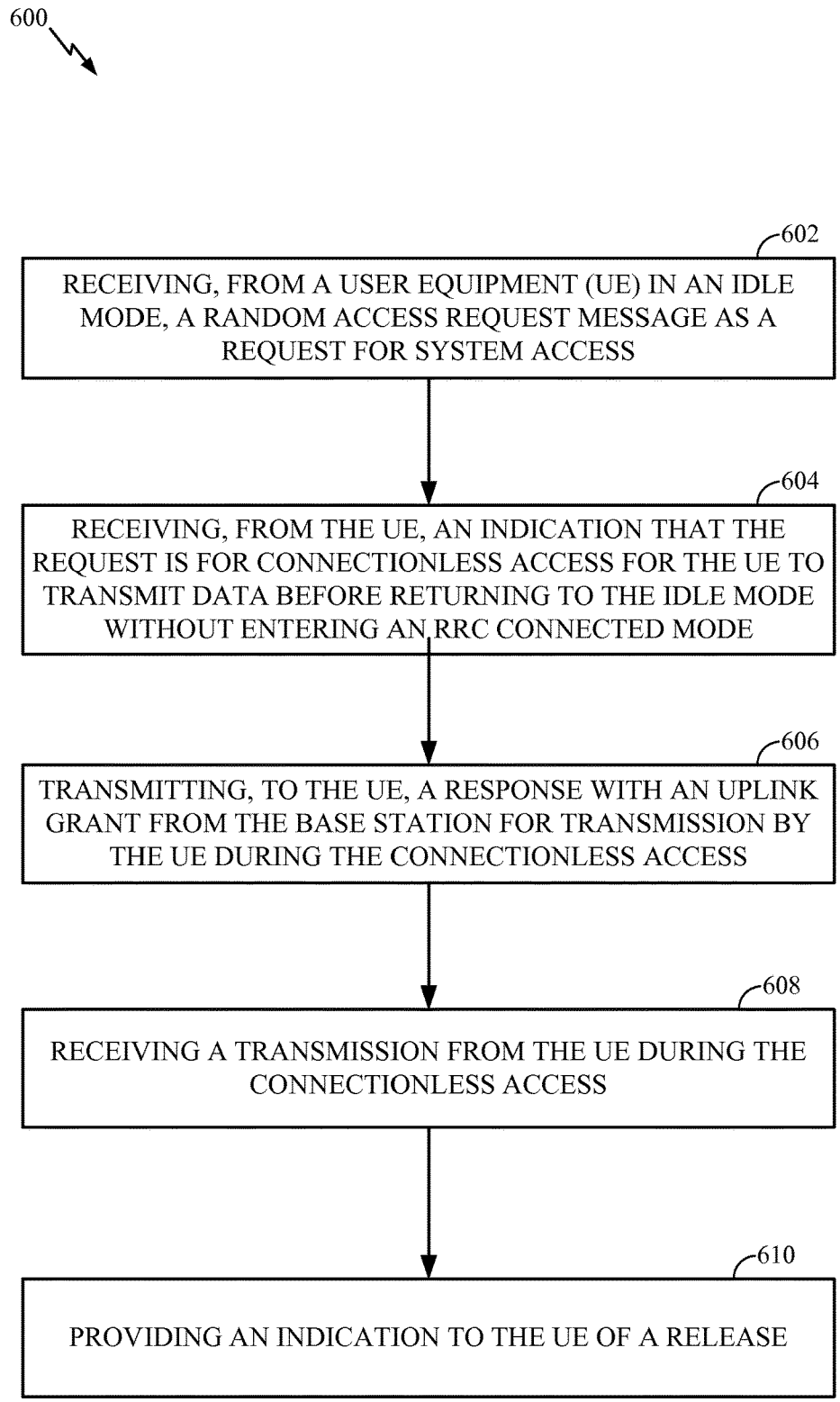
FIG. 6 is a flow diagram illustrating example operations for connectionless access that may be performed by a base station (BS), in accordance with certain aspects of the present disclosure.

FIG. 6 illustrates example operations 600 that may be performed by a BS, such as the BS 100 of FIG. 1, to provide for connectionless access with a UE, in accordance with certain aspects of the present disclosure. The operations 600 may be considered as complementary to operations 500 of FIG. 5

At 602, the BS receives, from a UE (e.g., UE 250 of FIG. 2) in an idle mode, a random access request message as a request for system access. At 604, the BS receives, from the UE, an indication that the request is for connectionless access for the UE to transmit data before returning to the idle mode without entering an RRC connected mode. At 606, the BS transmits, to the UE, a response with an UL grant from the BS for transmission by the UE during the connectionless access. At 608, the BS receives a transmission from the UE during the connectionless access. At 610, the BS provides an indication to the UE of a release. The example operations described with respect to FIGS. 5 and 6 are described in more detail using call flow diagrams illustrated in FIGS. 7-10.

Figure 7:
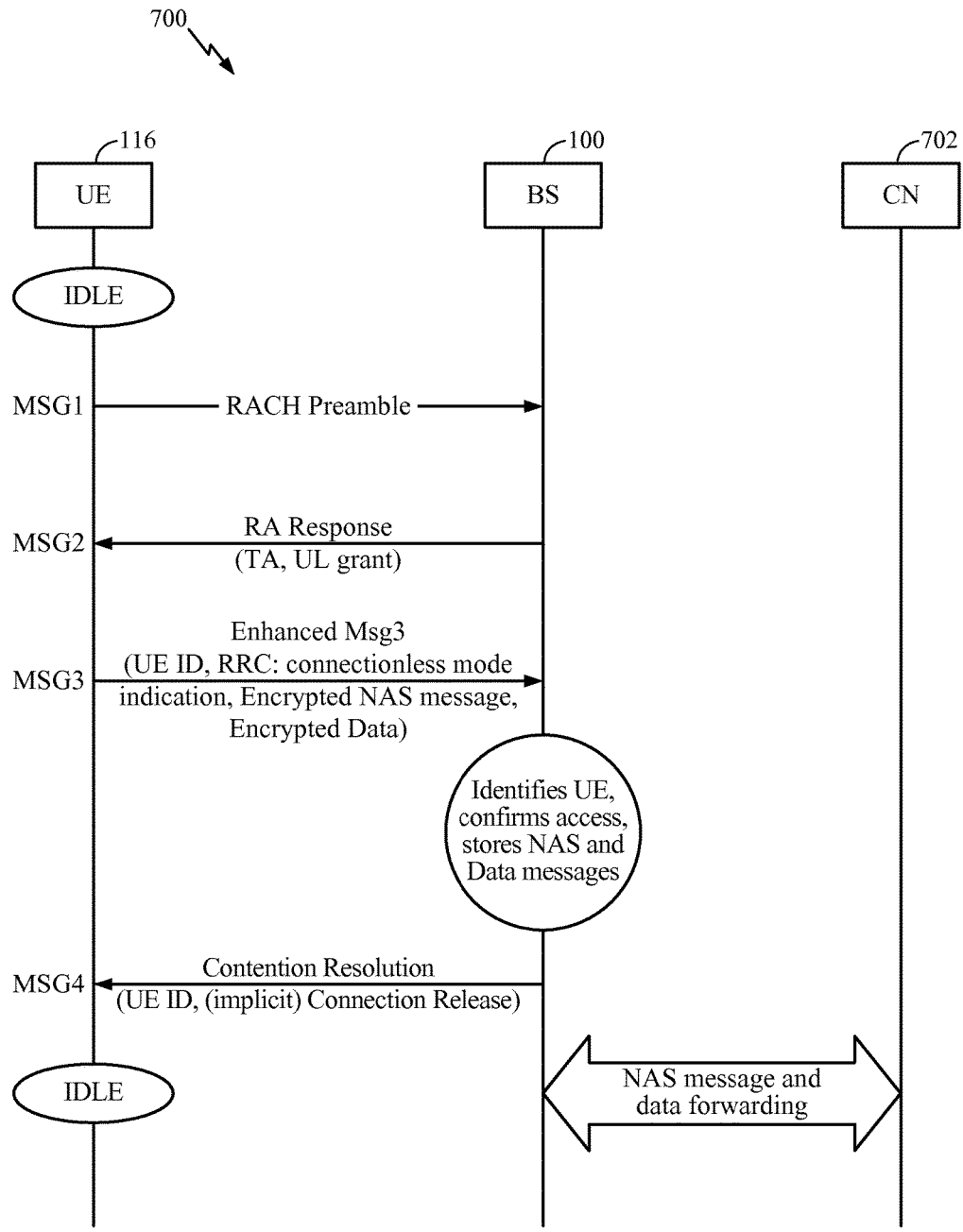
FIG. 7 is a call flow diagram illustrating a first example of connectionless access, in accordance with certain aspects of the present disclosure.

FIG. 7 illustrates an example call flow diagram 700 that shows an exchange of messages between a UE (e.g., UE 116) and BS (e.g., BS 100) for connectionless access, in accordance with aspects of the present disclosure. As shown, the UE, while in idle mode, may transmit an existing "legacy" format RACH preamble (MSG1) and receive a conventional response (MSG2). The response may be a random access response and include, for example, a TA and UL grant.

In this example, rather than a conventional MSG3, the UE may send an enhanced MSG3 that provides an indication that the requested access is for a connectionless access (e.g., via a cause value such as "RRC: connectionless"). The enhanced MSG3 may also include other information, such as an identifier corresponding to the UE (UE_ID), an Encrypted NAS message, security/NAS control message, Encrypted Data and/or other data. As illustrated, the BS 100 may then identify the UE 116 based on the UE ID, confirm access, and store the NAS and data messages (e.g., in memory 306). As illustrated, the BS 100 may transmit MSG4 comprising a contention resolution message (e.g., echoing the UE ID). This contention resolution message may serve as an indication of contention resolution and may also be used as an implicit indication of connection release. That is, the UE may interpret the contention resolution message as a connection release and return to idle mode. Meanwhile, the BS 100 may forward the stored NAS and/or data messages to the core network (CN).

In some cases, a BS may configure additional RACH resources for devices (e.g., enhanced MTC or eMTC devices) capable of connectionless access described herein. For example, the BS may broadcast additional RACH resources in a system information block (SIB). By configuring further RACH preamble groups, a UE may be able to implicitly indicate the amount of data the UE has to transmit by selection of its RACH preamble. For example, selecting a preamble from a first group may indicate the UE has a first amount of data to transmit, while selecting a preamble from a second group may indicate the UE has a second amount of data to transmit. Two RACH groups may be signaled in a SIB (e.g., to convey information). In some cases, the BS or the core network may configure a UE for connectionless access, and connectionless access is performed only when the UE is configured to do so.

Figure 8:
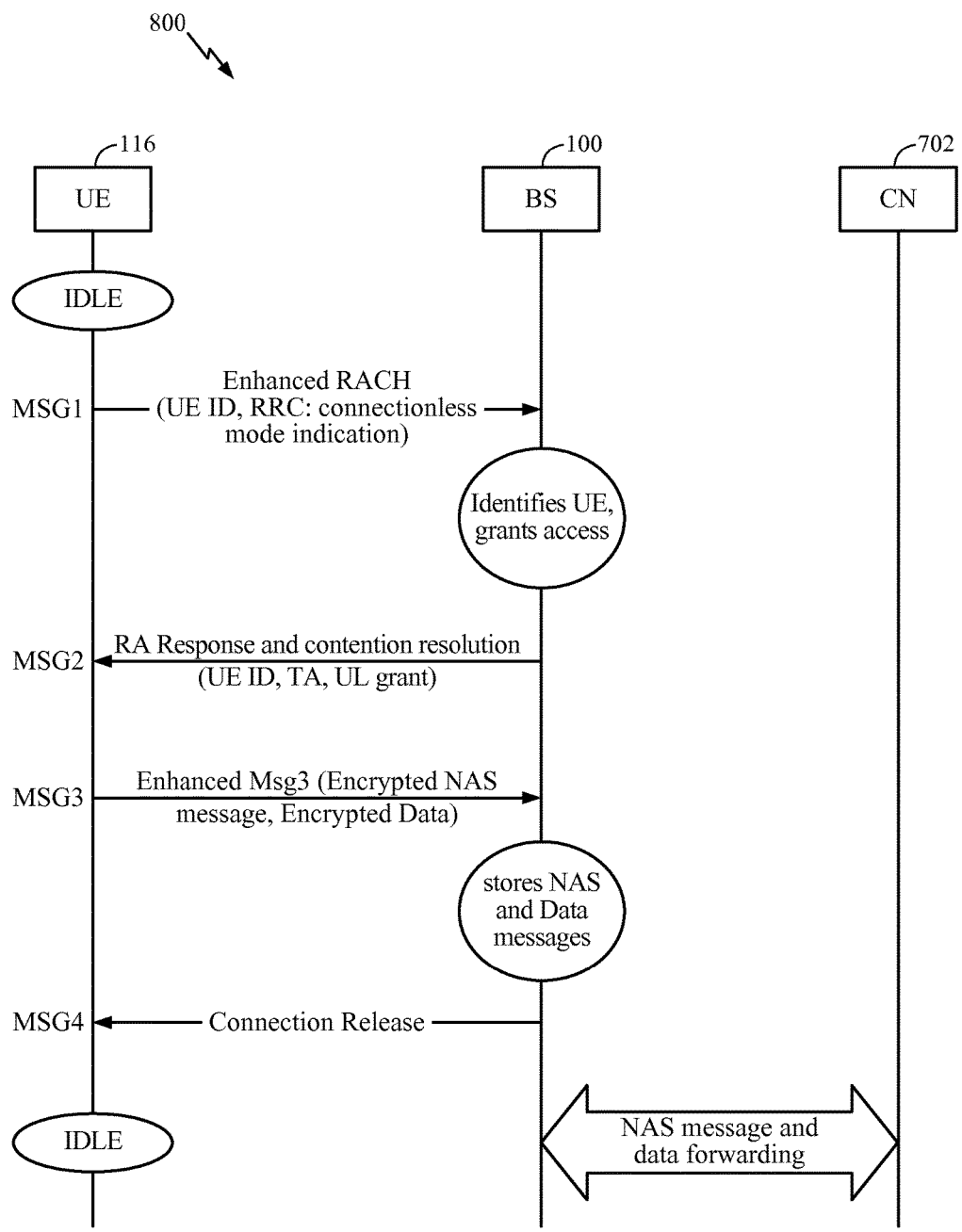
FIG. 8 is a call flow diagram illustrating a second example of connectionless access, in accordance with certain aspects of the present disclosure.
Figure 9:
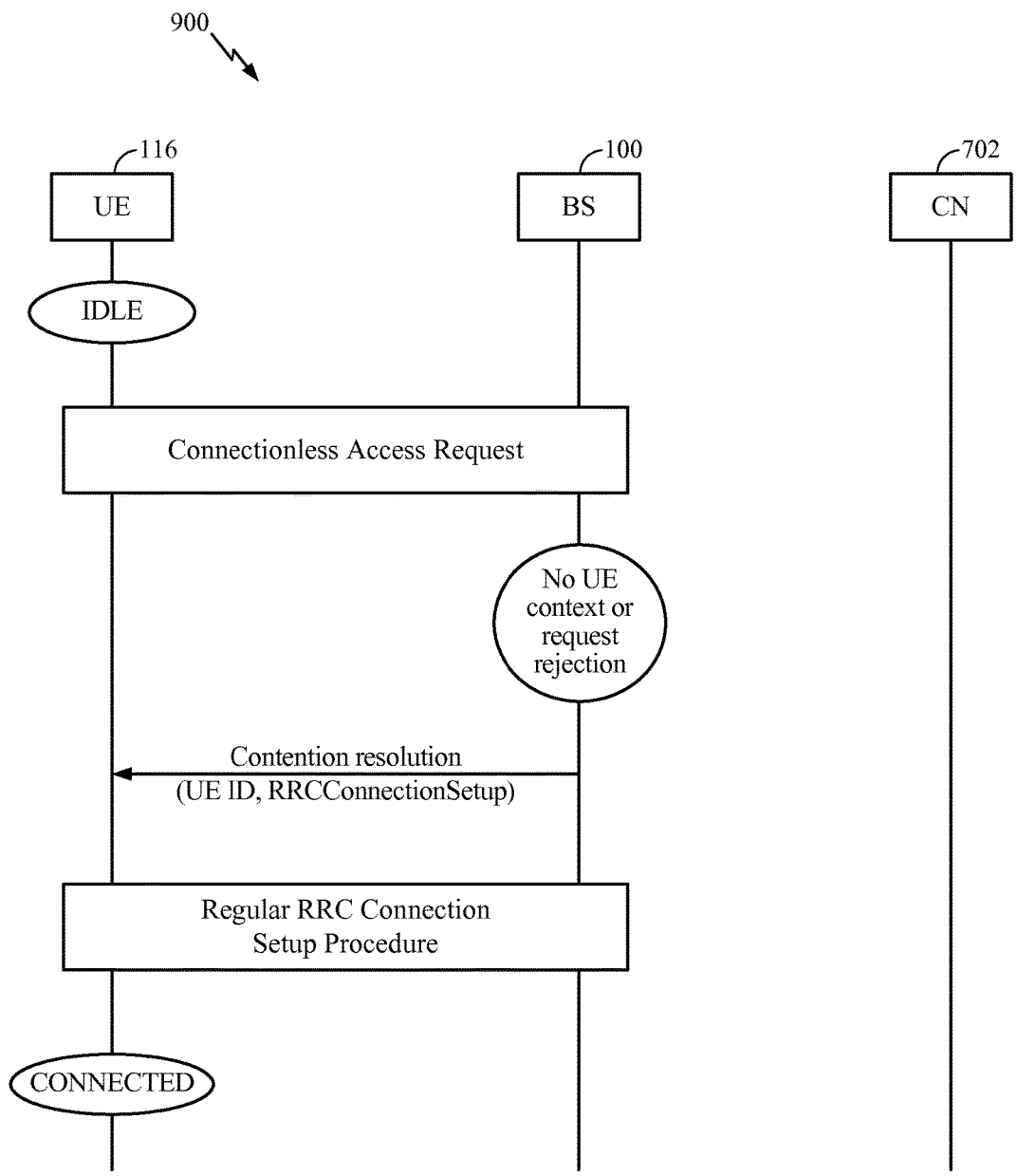
FIG. 9 illustrates an example of connectionless access with a fall-back to connected mode, in accordance with certain aspects of the present disclosure.

FIG. 8 illustrates another example call flow diagram 800 that show an exchange of messages between a UE 116 and BS 100 for connectionless access, in accordance with aspects of the present disclosure. In this example, rather than transmit a legacy MSG1, the UE may transmit an enhanced MSG1 (enhanced RACH) to indicate that the requested access is for a connectionless access (e.g., via a cause value such as "RRC: connectionless"). The enhanced MSG1 may also include a UE identification (ID) (e.g., NAS ID, C-RNTI, MACID, GUTI, IMSI, etc.), and optionally a buffer status report. Based on this information, the BS 100 may identify and grant access to the UE 116. As a result, the BS 100 may send MSG2 including an indication of contention resolution (e.g., echoing back the UE ID that was provided in the enhanced MSG 1) in the RA Response with an UL grant. In certain aspects, MSG2 may include a TA. The UE 116 may then use the UL grant to transmit an enhanced MSG3 including information such as an Encrypted NAS message, security/NAS control message, Encrypted Data and/or other data. As illustrated, the BS 100 may then store the NAS and/or data messages and send a connection release message (e.g., an explicit indication of a connection release). At this point, the UE may return to idle. As illustrated, the BS may forward the NAS and/or data messages to the core network (CN), e.g., for storage.

In either connectionless access technique of FIG. 7 or FIG. 8, after the UE completes its transmission, the UE may return to an idle state. In some cases, the UE may return to idle state after receiving an implicit release (via the contention resolution message) or an explicit RRC connection release message. As an alternative, the UE may return to the idle state upon reception of an acknowledgement (e.g., a HARQ ACK) for its MSG3. In some cases, the UE may return to the idle state after a timer expires (e.g., after a known time period) without any further messages from the eNB.

In some cases, the techniques provided herein for connectionless access may address various issues. For example, the techniques may address Contention Resolution failure, for example, by re-starting the random access procedure and falling back to a conventional random access for connected access. As illustrated in the call flow diagram 900 of FIG. 9, the UE 116 may send a request for connectionless access, however, the BS 100 may be unable to find UE context or may determine that the request for connectionless access is not to be granted (e.g., connectionless access fails). In such a scenario, in response to a failed request for connectionless access, the UE may fall back to a conventional connected access. For example, the BS 100 may send a contention resolution to the UE 116 including the UE ID and RRC connection setup. The UE 116 may then carry out conventional RRC connection setup procedures to enter RRC connected mode.

Figure 10:
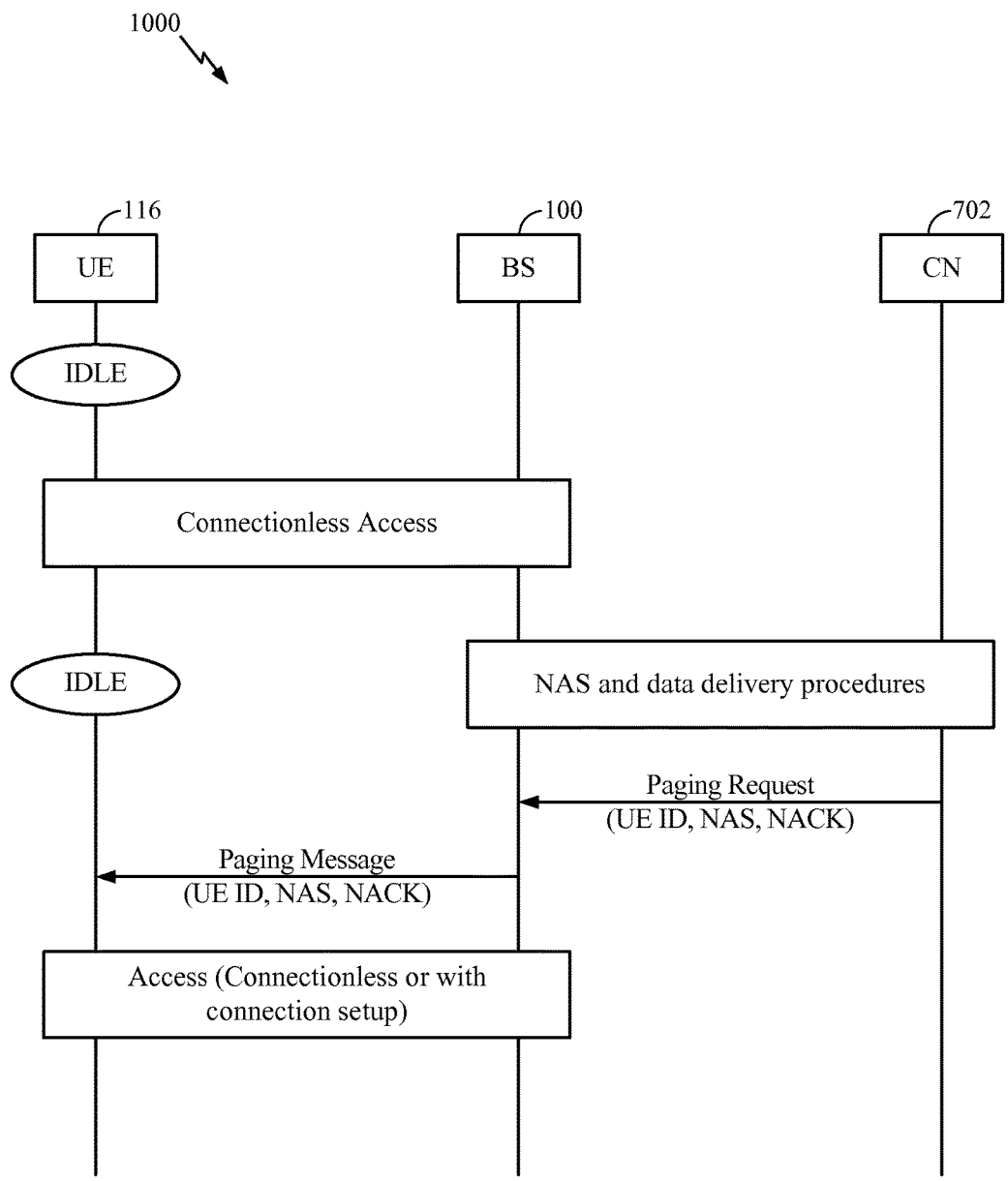
FIG. 10 illustrates an example of connectionless access with network paging, in accordance with certain aspects of the present disclosure.

As illustrated in the call flow diagram 1000 of FIG. 10, the data transmitted during connectionless access may be communicated with (e.g., forwarded to) a network (NAS and data delivery procedures) such that the network may provide a response (e.g., acknowledgement/negative acknowledgement via an ACK/NACK) to the data transmission. The response (e.g., a NACK) may be provided by the core network 702 via a paging request. The paging request may include the UE ID, along with a NACK. In response, the BS 100 may send the response to the UE 116 in a paging message (as the UE in idle mode still monitors for paging messages). The paging message may include the information from the paging request (e.g., UE ID, and NAS NACK).

In some cases, network pages as shown in FIG. 10 may only be provided if the response is negative (e.g., NACK). In this case, the UE may assume the transmission was successfully received if a NACK page is not received. If a NACK page is received, the UE may again carry out access procedures.

In some cases, the network may page the UE for both ACKs and NACKs. In this case, if a page message has a negative acknowledgement (NACK), the UE 116 may again carry out access procedures. In some cases, the UE may carry out access procedures if a paging message received by the UE after sending data (e.g., in a connectionless access) lacks any type of acknowledgement.

In any of the cases described above, when re-attempting to gain access to the network, the access may be for connected access (conventional) or connectionless access as described herein. In some cases, which access is used may depend on a network indication (e.g., via an RRCConnectionSetup message).

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Moreover, the term "or" is intended to mean an inclusive "or" rather than an exclusive "or." That is, unless specified otherwise or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members and duplicate members. As an example, "at least one of: a, b, or c" is intended to cover: a, b, c, a-b, a-c, b-c, a-b-c, aa, a-bbb-c, a-bb-ccc, etc.

The various operations of methods described above may be performed by any suitable means capable of performing the operations, such as various hardware and/or software/firmware component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software/firmware module executed by a processor, or in a combination of the two. A software/firmware module may reside in any form of storage medium that is known in the art. Some examples of storage media that may be used include random access memory (RAM), read only memory (ROM), flash memory, EPROM memory, EEPROM memory, phase change memory, registers, a hard disk, a removable disk, a CD-ROM and so forth. A software/firmware module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software/firmware, or a combination thereof. If implemented in software/firmware, the functions may be stored as one or more instructions on a computer-readable medium. A storage media may be any available media that can be accessed by a computer. By way of example, and not limitation, such computer-readable media can comprise RAM, ROM, phase change memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software/firmware or instructions may also be transmitted over a transmission medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized. For example, means for transmitting and means for providing may be performed by a transmitter, such as the transmitter 310 of FIG. 3, or by an antenna, such as the antenna 316 of FIG. 3. For example, means for providing may also be performed by a processor, such as the processor 304 of FIG. 3. For example, means for receiving may be performed by a receiver, such as the receiver 312 of FIG. 3, or by an antenna, such as the antenna 316 of FIG. 3. For example, means for returning may be performed by a processor, such as the processor 304 of FIG. 3.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications by a user equipment (UE), comprising:
   transmitting, while the UE is in an idle mode, a random access request message to a base station (BS) as a request for system access;
   providing an indication that the request is for connectionless access for transmitting data before returning to the idle mode without entering a radio resource control (RRC) connected mode;
   receiving a response with an uplink grant from the base station for transmission by the UE during the connectionless access;
   transmitting the data to the BS during the connectionless access, wherein the indication that the request is for connectionless access is provided when transmitting the data to the BS during the connectionless access;
   returning to the idle mode upon reception of an indication of a release; and
   monitoring for a paging message with an acknowledgement or negative acknowledgement of the transmission during the connectionless access.

2. The method of claim 1, wherein the random access request message comprises a random access preamble.

3. The method of claim 1, further comprising interpreting a contention resolution message as the indication of the release.

4. The method of claim 1, further comprising returning to idle mode if an acknowledgement or a negative acknowledgement is not received after a known time period.

5. The method of claim 1, further comprising, in response to a failed request for connectionless access, transmitting a request for system access for transmitting data by entering an RRC connected mode.

6. A method for wireless communications by a base station (BS), comprising:
   receiving, from a user equipment (UE) in an idle mode, a random access request message as a request for system access;
   receiving, from the UE, an indication that the request is for connectionless access for the UE to transmit data before returning to the idle mode without entering an RRC connected mode;
   transmitting, to the UE, a response with an uplink grant from the BS for transmission by the UE during the connectionless access; and
   receiving the data from the UE during the connectionless access, wherein the indication that the request is for connectionless access is received when receiving the data during the connectionless access;
   storing messages received from the UE during the connectionless access;
   forwarding the stored messages to a core network; and
   transmitting a paging message to the UE if a negative acknowledgement of the forwarded messages is received from the core network.

7. The method of claim 6, further comprising transmitting a contention resolution message as an indication of a release of the connectionless access.

8. The method of claim 6, further comprising:
   receiving, from the core network, a paging request with an acknowledgement of one or more of the forwarded messages; and
   transmitting the paging message to the UE with the acknowledgement.

9. The method of claim 6, wherein the paging message is transmitted to the UE only if the negative acknowledgement of the forwarded messages is received from the core network.

10. An apparatus for wireless communications by a user equipment (UE), comprising:
    means for transmitting, while the UE is in an idle mode, a random access request message to a BS as a request for system access;
    means for providing an indication that the request is for connectionless access for transmitting data before returning to the idle mode without entering a radio resource control (RRC) connected mode;

means for receiving a response with an uplink grant from the BS for transmission by the UE during the connectionless access;

means for transmitting the data to the BS during the connectionless access, wherein the indication that the request is for connectionless access is provided when transmitting the data to the BS during the connectionless access; and means for returning to the idle mode upon reception of an indication of a release; and means for monitoring for a paging message with an acknowledgement or negative acknowledgement of the transmission during the connectionless access.

11. The apparatus of claim 10, wherein the random access request message comprises a random access preamble.

12. The apparatus of claim 10, further comprising, means for transmitting a request for system access for transmitting data by entering an RRC connected mode, in response to a failed request for connectionless access.

13. An apparatus for wireless communications by a base station (BS), comprising:

means for receiving, from a user equipment (UE) in an idle mode, a random access request message as a request for system access;

means for receiving, from the UE, an indication that the request is for connectionless access for the UE to transmit data before returning to the idle mode without entering an RRC connected mode;

means for transmitting, to the UE, a response with an uplink grant from the BS for transmission by the UE during the connectionless access; and means for receiving the data from the UE during the connectionless access, wherein the indication that the request is for connectionless access is received when receiving the data during the connectionless access;

means for storing messages received from the UE during the connectionless access;

means for forwarding the stored messages to a core network; and means for transmitting a paging message to the UE if a negative acknowledgement of the forwarded messages is received from the core network.

14. The apparatus of claim 13, further comprising:

means for receiving, from the core network, a paging request with an acknowledgement of one or more of the forwarded messages; and means for transmitting the paging message to the UE with the acknowledgement.

* * * * *